J. S. HEWITT.
HAY RAKE AND LOADER.
No. 189,626. Patented April 17, 1877.
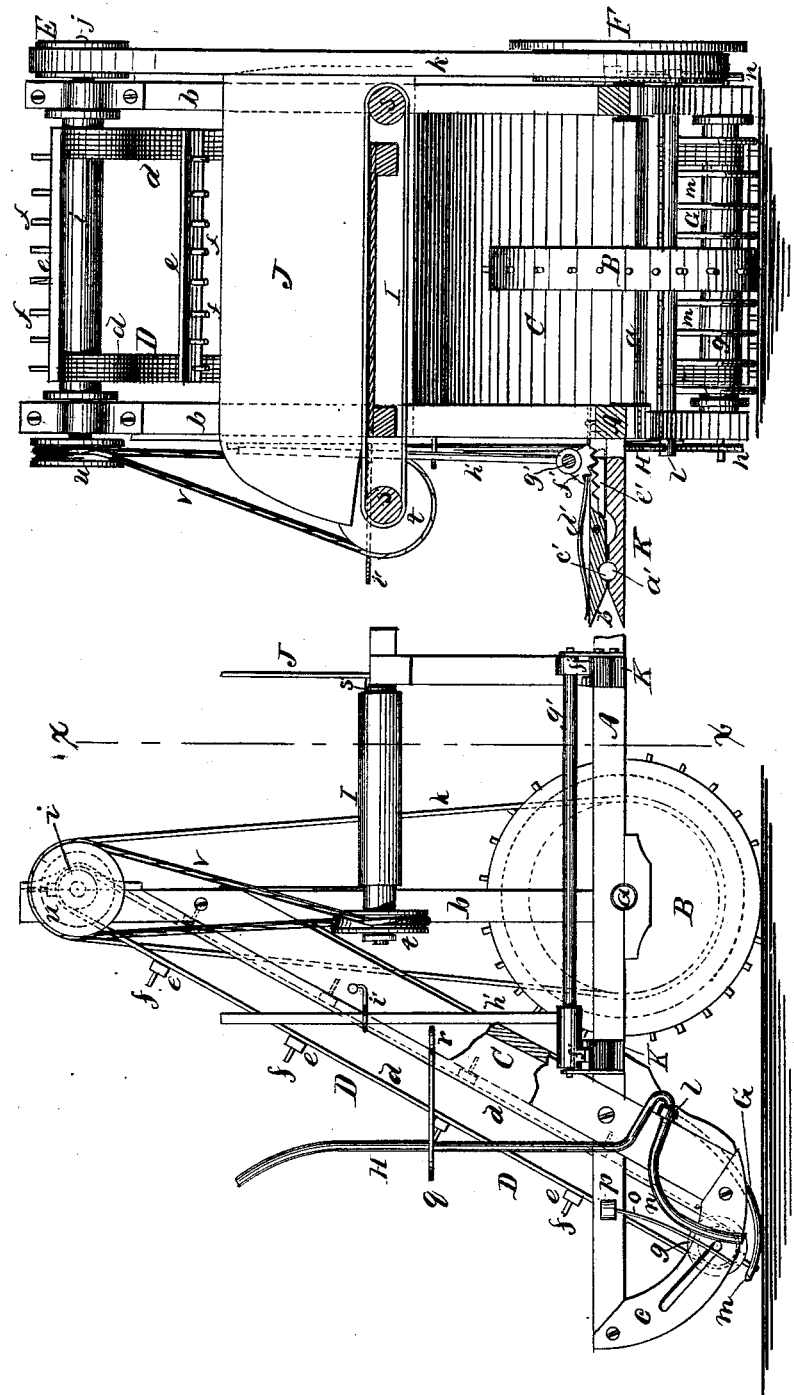
WITNESSES:
Francis McArdle
J. H. Scarborough
INVENTOR:
J. S. Hewitt
BY
ATTORNEYS.

UNITED STATES PATENT OFFICE.

JOHN S. HEWITT, OF WHEATLAND, MISSOURI.

IMPROVEMENT IN HAY RAKERS AND LOADERS.

Specification forming part of Letters Patent No. 189,626, dated April 17, 1877; application filed February 26, 1877.

*To all whom it may concern:*

Be it known that I, JOHN STANLEY HEWITT, of Wheatland, in the county of Hickory and State of Missouri, have invented a new and Improved Hay-Loader, of which the following is a specification:

Figure 1 is a side elevation. Fig. 2 is a rear elevation in section on line $x\,x$ in Fig. 1.

Similar letters of reference indicate corresponding parts.

The object of my invention is to provide a machine that may be attached to the side of a wagon, which will gather the hay from the ground and deliver it to the hay-rack carried by the wagon.

Referring to the drawing, A is the frame of the machine, which is mainly supported by the shaft $a$ of the wheel B. C is an inclined chute attached to the front of the frame A, and extending upward above the wheel B, and supported by posts $b$ attached to the frame A.

The sides of the chute C extend downward below the side pieces of the frame A to receive a curved piece, $c$, one end of which is attached to the front of the frame A.

D is an endless apron or carrier, consisting of the belts $d$ and cross-bars $e$, having teeth $f$. The lower end of the carrier D runs over a drum, $g$, whose shaft revolves in slots $h$ in the pieces $c$. The upper end of the carrier D runs over a drum, $i$, whose shaft $j$ is journaled in boxes attached to the upper ends of posts $b$.

E is a pulley, secured to the end of the shaft $j$, and driven from a pulley, F, on the shaft $a$ by a belt, $k$.

G is a rake, consisting of the shaft $l$, having curved teeth $m$, which project downward and forward in an inclined direction. The shaft $l$ is journaled in the side pieces of the chute C, and the teeth $m$ form a continuation of the back of the chute.

H is a lever attached to the shaft $l$ for moving the rake G. Curved arms $n$ project from the shaft $l$, and under the projecting ends of the shaft of the drum $g$.

By moving the upper end of the lever H backward the arms $n$ are made to raise the drum $g$.

The spring $o$, attached to stud $p$, projecting from the frame A presses upon the projecting ends of the shaft of the drum $g$.

The upper end of the lever H moves in a slotted bar, $q$, which is provided with a notch at $r$ for retaining the said lever when it is drawn back.

I is a horizontal endless apron placed on drums $s\,s'$, which are journaled in the frame A. A pulley, $t$, is placed on the shaft of the drum I, which takes its motion from the pulley $u$ on the shaft $j$ of the drum $i$ by a belt, $v$. A board, J, is placed at the rear edge of the apron I to prevent the hay from dropping over the rear of the machine.

Arms K project from the side of the machine, having a semicircular recess, $a'$, and to which a hinged piece, $b'$, is attached, in which a semicircular recess, $c'$, is formed corresponding to the recess $a'$. A spring, $d'$, forces the part $b'$ against the arm K, and sliding racks $e'$, having beveled ends, are capable of being forced under the beveled shoulder of the part $b'$ by toothed sectors $f'$ placed on a shaft, $g'$, which is journaled in posts projecting upward from the arms K, and is moved by the lever $h'$, which may be locked in the slotted iron $i'$, by which its upper end is guided.

The operation is as follows: The sill of the hay-rack is rounded at two places to receive the arm K and part $b'$, whose semicircular recesses clamp the rounded portion of the sill.

As the wagon is drawn forward the machine is set in operation by the rotation of the wheel B, the teeth on the periphery of the said wheel insuring a positive action.

The forward motion of the machine gathers the hay on the teeth of the rake G. The endless apron D elevates the hay and delivers it to the apron I, which carries it laterally to the rack of the wagon. The height of the teeth of the rake may be varied to suit the inequalities of the ground by moving the levers H.

The endless apron I may be extended more or less over the wagon-rack.

Having thus described my invention, I claim as new and desire to secure by Letters Patent—

1. The combination of the lever H, rake G, arms $n$, drum $g$, and its shaft, slotted piece $c$, and the springs $o$, substantially as herein shown and described.

2. The arms K, hinged pieces $b'$, racks $e'$, toothed sectors $f'$, shaft $g'$, and lever $h'$, substantially as herein shown and described.

JOHN S. HEWITT.

Witnesses:
J. H. DAVIDSON,
R. P. WOODBURY.